US012617196B2

(12) United States Patent
Nygren et al.

(10) Patent No.: US 12,617,196 B2
(45) Date of Patent: May 5, 2026

(54) METHOD TO PRODUCE A PANEL WITH AN EMBOSSED STRUCTURE

(71) Applicant: Välinge Innovation AB, Viken (SE)

(72) Inventors: Per Nygren, Ramlösa (SE); Per Josefsson, Ramlösa (SE); Filip Sköld, Löddeköpinge (SE); Christoffer Nilsson, Helsingborg (SE)

(73) Assignee: VÄLINGE INNOVATION AB, Viken (SE)

( * ) Notice: Subject to any disclaimer, the term of this patent is extended or adjusted under 35 U.S.C. 154(b) by 227 days.

(21) Appl. No.: 18/325,534

(22) Filed: May 30, 2023

(65) Prior Publication Data

US 2023/0382099 A1     Nov. 30, 2023

(30) Foreign Application Priority Data

May 31, 2022     (SE) ..................................... 2250648-9

(51) Int. Cl.
    *B32B 38/06*        (2006.01)
    *B32B 27/30*        (2006.01)
    *B32B 38/00*        (2006.01)

(52) U.S. Cl.
    CPC ............ *B32B 38/06* (2013.01); *B32B 27/304* (2013.01); *B32B 38/145* (2013.01); *B32B 2327/06* (2013.01); *B32B 2419/04* (2013.01)

(58) Field of Classification Search
    CPC ..... B32B 38/06; B32B 27/304; B32B 38/145; B32B 2327/06; B32B 2419/04;
        (Continued)

(56) References Cited

U.S. PATENT DOCUMENTS 3,681,159 A * 8/1972 Portnoy .................. B26F 1/384
                                264/293
5,670,237 A    9/1997 Shultz et al.
        (Continued)

FOREIGN PATENT DOCUMENTS

WO      2016/114710 A1    7/2016

OTHER PUBLICATIONS

International Search Report and Written Opinion received for PCT Patent Application No. PCT/SE2023/050529, mailed on Jun. 13, 2023, 10 pages.

(Continued)

*Primary Examiner* — Christopher W Raimund
(74) *Attorney, Agent, or Firm* — Boone IP Law

(57) ABSTRACT

A method to produce a panel with an embossed structure, including forming a substrate by a continuous process, wherein the substrate includes a polymer based material, providing a printed polymer based film, applying the printed polymer based film on the substrate, the printed polymer based film being continuously applied on the substrate, pressing the printed polymer based film to the substrate, thereby forming a laminated substrate, and embossing the laminated substrate by an embossing device having a perimeter, such that the laminated substrate obtains an embossed structure, dividing the laminated substrate into panels, each panel having a length and a width, and wherein the perimeter of the embossing device divided by the length of said panel is a non-integer.

16 Claims, 6 Drawing Sheets

(58) Field of Classification Search

CPC ... B32B 2255/10; B32B 2307/75; B32B 3/28;
B32B 3/30; B32B 27/08; B32B 27/20;
B32B 2264/065; B32B 2264/067; B32B
37/1027; B32B 2264/104; B32B 2479/00;
B32B 37/153

See application file for complete search history.

(56) References Cited

U.S. PATENT DOCUMENTS

| | | | | |
|---|---|---|---|---|
| 2006/0005498 | A1* | 1/2006 | Sabater | B44F 9/02 |
| | | | | 52/589.1 |
| 2006/0032175 | A1* | 2/2006 | Chen | B32B 21/08 |
| | | | | 52/578 |
| 2008/0311355 | A1 | 12/2008 | Chen et al. | |
| 2010/0009102 | A1* | 1/2010 | Vermeulen | B44C 5/04 |
| | | | | 428/34.1 |
| 2011/0250404 | A1 | 10/2011 | Pervan et al. | |
| 2014/0023832 | A1 | 1/2014 | Pervan et al. | |
| 2015/0258716 | A1* | 9/2015 | Hanning | B44F 9/00 |
| | | | | 264/293 |
| 2021/0023832 | A1 | 1/2021 | Ziegler et al. | |

OTHER PUBLICATIONS

Office Action received for Swedish Patent Application No. 2250648.
9, mailed on Dec. 19, 2022, 8 pages.
U.S. Appl. No. 18/510,800, Martin Bjeremyr, filed Nov. 16, 2023.
U.S. Appl. No. 18/325,538, Christoffer Nilsson, filed May 30, 2023.
U.S. Appl. No. 14/994,593, Niclas Håkansson, filed Jan. 13, 2016.
U.S. Appl. No. 18/192,858, Per Nygren, filed Mar. 30, 2023.
U.S. Appl. No. 18/487,049, Christer Lundblad, filed Oct. 14, 2023.
U.S. Appl. No. 18/409,984, Darko Pervan, filed Jan. 11, 2024.
U.S. Appl. No. 18/420,003, Niclas Håkansson, filed Jan. 23, 2024.

* cited by examiner

11

R

11

12

R

METHOD TO PRODUCE A PANEL WITH AN EMBOSSED STRUCTURE

CROSS REFERENCE TO RELATED APPLICATIONS

The present application claims the benefit of Swedish Application No. 22506489, filed on May 31, 2022. The entire contents of Swedish Application No. 22506489 are hereby incorporated herein by reference in their entirety.

TECHNICAL FIELD

Examples of the present disclosure relate to a method to produce a panel with an embossed structure. The panel may be a building panel, such as a floor panel, a furniture component, a worktop, a wall panel, a ceiling panel.

TECHNICAL BACKGROUND

Panels such as building panels may be provided with a print for decorative purposes. The print may be a wood grain pattern simulating wood. In other examples, the print may be a stone pattern simulating stone, or a fantasy pattern. In order to increase the realistic look and feel of the panel, the panel may be provided with an embossed structure, comprising embossed portions and protrusions. The embossed structure may be in register with the print, such that the embossed structure matches the elements of the print. The elements of the print may be grains, knots, medullary rays, and other elements depicting structures in wood.

The print may be printed by various methods. One method commonly used is rotogravure printing, wherein the pattern is printed by several gravure cylinders. Digital printing allows more variations in the print, thus being more flexible compared to engraving gravure cylinders.

During recent years in the field of flooring, vinyl tiles have gained increasing success. One such type of tiles is SPC (Stone Plastic Composite), wherein the core is formed in a continuous process by extruding the core material. The pattern is provided by a separate print film, which most commonly is printed by rotogravure printing. The print film and a protective layer arranged above the print film is pressed to the core by one or several pressing rollers. An embossed structure may be pressed into the panel by an embossing roller.

Due to the cost for engraving gravure cylinders and embossing rollers is the number of unique designs limited. Thus, after dividing the substrate into individual panels, a certain repetition of the pattern occurs after a number of panels. When installing the floor such repetitions are undesired. Increasing the number of variations and reduce the number of identical panels are therefore desired to improve the realistic look and feel of the floor.

SUMMARY

It is an object of at least examples of the present disclosure to provide an improvement over the above described techniques and known art.

According to a first aspect of the disclosure, a method to produce a panel with an embossed structure is provided. The method comprises:

providing a substrate, wherein the substrate comprises a polymer based material,
  providing a printed polymer based film,
  applying the printed polymer based film on the substrate, pressing the printed polymer based film to the substrate, thereby forming a laminated substrate, and
  embossing the laminated substrate by an embossing device having a perimeter, such that the laminated substrate obtains an embossed structure,
  dividing the laminated substrate into panels, each panel having a length and a width, and
  wherein the perimeter of the embossing device divided by the length of said panel is a non-integer.

As used herein, the term "perimeter" means the length of the outer edge of a shape. In particular, the perimeter of the embossing device, as used herein means the length of the outer edge of the embossing device, which corresponds to the embossing length, such as the length of the embossing structure.

Providing a substrate may comprise forming a substrate by a continuous process.

The printed polymer based film may be continuously applied on the substrate.

By the length of the panel not corresponding to the perimeter of the embossing device, and thereby not corresponding to the length of the embossed structure, a displacement of the embossed structure is obtained between the panels. Thereby, the embossed structure of one panel is not identical to an embossed structure of another panel. Consequently, the number of non-identical panels obtained can be increased.

The non-integer may be regarded as a displacement factor.

The laminated substrate may be divided into panels having equal length.

The substrate may have a length and a width. The printed polymer based film may have a length and a width. The length direction of the printed polymer based film may be substantially parallel to the length direction of the substrate.

The embossed structure may have a length and a width, wherein the length direction of the embossed structure may be substantially parallel to the length direction of the printed polymer based film.

The embossing device may be an embossing roller or an embossing belt.

Pressing and embossing may take place simultaneously. Pressing and embossing may be performed by a common device, such as an embossing roller or embossing belt configured for both pressing and embossing.

The perimeter of the embossing device may exceed the length of the panel.

The perimeter of the embossing device may be at least 110% of the length of the panel.

The perimeter of the embossing device may be in the range of 110-190% of the length of the panel.

The non-integer may exceed 1.

The non-integer may be in the range of 1.1-1.9. The non-integer may be in the range of 2.1-2.9. The non-integer may be in the range of an integer n+0.1 to the integer n+0.9, such as in the range of 1.1-1.9 or 2.1-2.9 or 3.1-3.9. The integer may be chosen such as unnecessary repetition may be avoided, such as avoiding the integer being equal to n+0.5, such as 1.5, 2.5 etc. As such, the non-integer may be in the range of an integer n+0.1 to n+0.4 and n+0.6 to n+0.9; such as 1.1-1.4, 1.6-1.9, 2.1-2.4, 2.6-2.9, 3.1-3.4, 3.6-3.9, etc.

The embossed structure may be at least partly in register with a pattern of the printed polymer based film. Typically, a pattern of a polymer based film comprises a large number of design elements. An embossed structure corresponding to a pattern of a polymer based film typically comprises a portion of the design elements. If pattern of a polymer based film is complex or crowded, a complete embossing in register with such pattern may have a disadvantageous appearance. As used herein the wording "partly in register with a pattern" means being in register with a portion of a pattern. Thus, the embossed structure may be in register with at least a portion of the pattern of the printed polymer based film.

The pattern may have a pattern repetition having a pattern repetition length, wherein the perimeter of the embossing device may substantially correspond to the pattern repetition length.

The pattern repetition may comprise one or more patterns, wherein each pattern is non-identical to another pattern in the patter repetition.

The repetition length may be measured in the length direction of the printed polymer based film.

The pattern repetition length may be measured from the beginning of the first pattern in the pattern repetition to the end of the last pattern in the pattern repetition, as measured in the length direction of the polymer based film. In the case the pattern repetition only comprises one pattern, the pattern repetition length may be measured from the beginning of the pattern to the end of the pattern, as measured in the length direction of the polymer based film.

The printed polymer based film may be printed by a rotogravure cylinder, wherein a circumference of the rotogravure cylinder may substantially correspond to the perimeter of the embossing device.

The polymer based film may be printed by digital printing, such as inkjet printing.

The panel may be a plank or a tile.

The pattern or patterns may be a wood grain pattern or wood grain patterns.

The substrate may be formed by a continuous process.

The polymer based film may be continuously applied on the substrate.

The polymer based film may be applied inline with the production process of the substrate.

Forming the substrate and applying the polymer based film may be a continuous process.

The substrate may be formed by extruding.

A barrel temperature of the extruder may be 145-225° C.

The polymer based film may be applied to the substrate prior to cooling the substrate.

The polymer of the polymer based film may be a thermoplastic polymer.

The polymer of the polymer based film may be a thermosetting polymer.

The polymer based film may be free from paper, such as being non paper based.

The polymer based film may be made of a polymeric material, such as a thermoplastic or a thermoset. The polymer based film may be a PVC film.

The polymer based material of the substrate may be a thermoplastic material or a thermosetting material.

The substrate may further comprise fillers. The fillers may be organic and/or inorganic. The fillers may be one or more of: calcium carbonate, chalk, limestone, talc, stone dust, fly ash, wood dust, grounded risk husk, cork, and bamboo dust.

Pressing may comprise applying heat and pressure.

The method may further comprise applying a protective layer to said polymer based film prior to embossing.

The protective layer may be a polymer based film such a thermoplastic film or a thermosetting film.

According to a second aspect, a method to produce a panel with an embossed structure is provided. The method comprises:

providing a substrate, wherein the substrate comprises a polymer based material, providing a polymer based film printed a print having a pattern repetition comprising one or more patterns, and wherein the pattern repetition has a pattern repetition length measured in a length direction of the polymer based film, applying the polymer based film on the substrate, pressing said polymer based film to the substrate, thereby forming a laminated substrate, and embossing the laminated substrate by an embossing device such that the laminated substrate obtains an embossed structure, dividing the laminated substrate into panels, each panel having a length and a width, and wherein the pattern repetition length divided by the length of said panel is a non-integer.

Providing a substrate may comprise forming a substrate by a continuous process.

The printed polymer based film may be continuously applied on the substrate.

If the pattern comprises two or more patterns, the patterns are subsequent each other in a length direction of the polymer based film. Each pattern in the pattern repetition is not identical to another pattern in the pattern repetition.

By the length of the panel not corresponding to the pattern repetition length, a displacement of the patterns is obtained between the panels. Thereby, the pattern of one panel is not identical to a pattern of another panel.

The non-integer may be regarded as a displacement factor.

A perimeter of the embossing device may correspond to the pattern repetition length.

The perimeter of the embossing device divided by the length of said panel may be a non-integer.

By the length of the panel not corresponding to the perimeter of the embossing device, and thereby not corresponding to the length of the embossed structure, a displacement of the embossed structure is obtained between the panels. Thereby, the embossed structure of one panel is not identical to an embossed structure of another panel. Consequently, the number of non-identical panels obtained can be increased.

The pattern repetition length may be measured from the beginning of the first pattern in the pattern repetition to the end of the last pattern in the pattern repetition, as measured in the length direction of the polymer based film. In the case the pattern repetition only comprises one pattern, the pattern repetition length may be measured from the beginning of the pattern to the end of the pattern, as measured in the length direction of the polymer based film.

The pattern repetition length may substantially correspond to the length of the printed polymer film. If the pattern repetition only comprises one pattern in the length direction, the length of the pattern may substantially correspond to the length of printed polymer film.

The laminated substrate may be divided into panels having equal length.

The substrate may have a length and a width. The printed polymer based film may have a length and a width. The length direction of the substrate may be substantially parallel to the length direction of the printed polymer based film.

The embossing device may be an embossing roller or an embossing belt.

Pressing and embossing may take place simultaneously. Pressing and embossing may be performed by a common device, such as an embossing roller or embossing belt configured for both pressing and embossing.

The pattern repetition length may exceed the length of the panel.

The pattern repetition length may be at least 110% of the length of the panel, such as in the range of 110-190%.

The perimeter of the embossing device may exceed the length of the panel.

The perimeter of the embossing device may be at least 110% of the length of the panel, such as in the range of 110-190%.

The non-integer may exceed 1.

The non-integer may be in the range of 1.1-1.9. The non-integer may be in the range of 2.1-2.9. The non-integer may be in the range of an integer n+0.1 to the integer n+0.9, such as in the range of 1.1-1.9 or 2.1-2.9 or 3.1-3.9. The integer may be chosen such as unnecessary repetition may be avoided, such as avoiding the integer being equal to n+0.5, such as 1.5, 2.5 etc. As such, the non-integer may be in the range of an integer n+0.1 to n+0.4 and n+0.6 to n+0.9; such as 1.1-1.4, 1.6-1.9, 2.1-2.4, 2.6-2.9, 3.1-3.4, 3.6-3.9, etc.

The embossed structure may be at least partly in register with the pattern, or patterns.

The polymer based film may be printed by a rotogravure cylinder, wherein a circumference of the rotogravure cylinder may correspond to the perimeter of the embossing device.

The polymer based film may be printed by digital printing, such as inkjet printing.

The panel may be plank or a tile.

The pattern or patterns may be a wood grain pattern or wood grain patterns.

The substrate may be formed by a continuous process.

The polymer based film may be continuously applied on the substrate.

The polymer based film may be applied inline with the production process of the substrate.

Forming the substrate and applying the polymer based film may be a continuous process.

The substrate may be formed by extruding.

A barrel temperature of the extruder may be 145-225° C.

The polymer based film may be applied to the substrate prior to cooling the substrate.

The polymer of the polymer based film may be a thermoplastic polymer.

The polymer of the polymer based film may be a thermosetting polymer.

The polymer based film may be free from paper, such as being non paper based.

The polymer based film may be made of a polymeric material, such as a thermoplastic or a thermoset. The polymer based film may be a PVC film.

The polymer based material of the substrate may be a thermoplastic material or a thermosetting material.

The substrate may further comprise fillers. The fillers may be organic and/or inorganic. The fillers may be one or more of: calcium carbonate, chalk, limestone, talc, stone dust , fly ash, wood dust, grounded risk husk, cork, and bamboo dust.

Pressing may comprise applying heat and pressure.

The method may further comprise applying a protective layer to said polymer based film prior to embossing.

The protective layer may be a polymer based film such a thermoplastic film or a thermosetting film.

BRIEF DESCRIPTION OF THE DRAWINGS

The present disclosure will by way of example be described in more detail with reference to the appended schematic drawings, which show examples of the present disclosure.

DETAILED DESCRIPTION

Figure 1A:
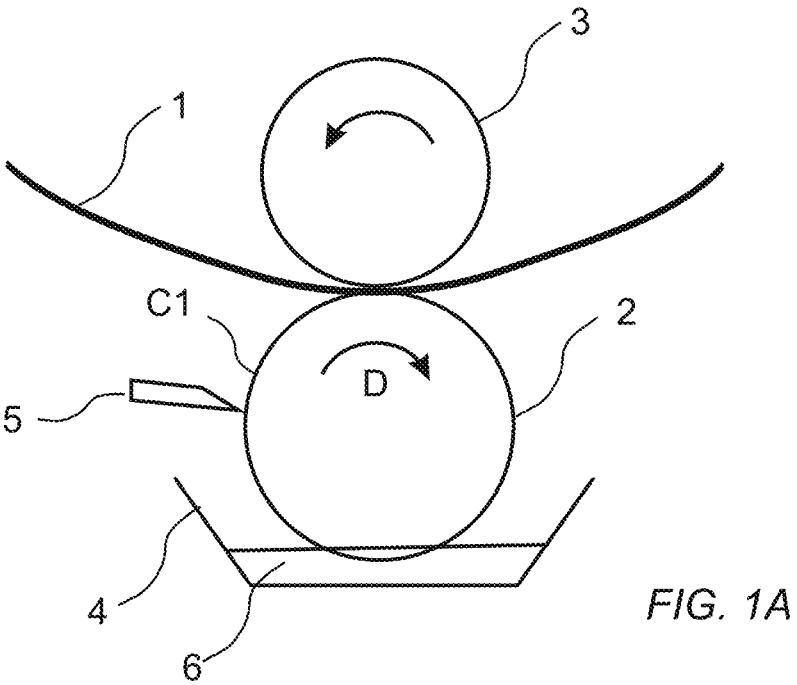
FIG. 1A shows schematically a rotogravure printing process of a polymer based film.

FIG. 1A shows schematically a rotogravure printing process in cross-section. In rotogravure printing, one or more gravure cylinders apply ink on the substrate to be printed. Conventionally, one gravure cylinder applies one colour. For CMYK, four gravure cylinders are included in the rotogravure printing process. In FIG. 1A, one gravure cylinder 2 is schematically shown in cross-section.

In rotogravure printing, ink 6 is placed in an ink tray 4 and the gravure cylinder 2 is immersed in the ink tray 4 to convey ink 6 from the ink tray 4 to the substrate to be printed. The gravure cylinder 2 is engraved with a pattern. A doctor blade 5 removes excess ink 6 from the gravure cylinder 2 such that ink 6 is only present in recesses of the engraved pattern of the gravure cylinder. The substrate passes between the gravure cylinder 2 and an impression roller 3. Thereby, ink 6 is transferred from the gravure cylinder 2 to a surface of the substrate. The process is repeated for every colour applied.

In the present disclosure, the substrate to be printed may be a polymer based film 1. The polymer based film 1 may be a thermoplastic film. The polymer based film 1 may be a thermosetting film. In one example, the polymer based film 1 may be free from paper.

The polymer based film 1 may be of a polymer material. The polymer material may be a thermoplastic or a thermoset.

The polymer based film 1 may be of, or comprise, polyvinyl chloride (PVC), polyester, polypropylene (PP), polyethylene (PE), polystyrene (PS), thermoplastic polyurethane (PU), thermosetting polyurethane (PU), polyethylene terephthalate (PET), polyacrylate, methacrylate, polycarbonate, polyvinyl butyral, polybutylene terephthalate, or a combination thereof.

In one example, the polymer based film 1 is a PVC film. In another example, the polymer based film may be a thermosetting PU film.

The polymer based film 1 may have thickness of 0.01-0.1 mm.

The polymer based film 1 may have a rectangular shape, such as having a length and a width. The length may exceed the width of the polymer based film 1.

The polymer based film 1 may have a size substantially corresponding to the size of a substrate, to which the polymer based film 1 is to be applied in further step. The polymer based film 1 may have a width of 1-1.5 m, such as 1 m or 1.3 m.

In one example, the polymer based film 1 is printed by a rotogravure printing process as described above with reference to FIG. 1A. The polymer based film 1 is printed by a gravure cylinder 2 being engraved with one or more patterns, as seen in the rotational direction of the gravure cylinder 2. Said one or more patterns are subsequent each other as seen in a rotational direction D of the gravure cylinder 2. In one example, the gravure cylinder 1 is engraved with a first pattern and a second pattern. The second pattern is subsequent the first pattern as seen in the rotational direction D of gravure cylinder 1. Each pattern is unique and not equal or identical to another pattern.

The gravure cylinder 2 has a circumference C1. The gravure cylinder 2 has a rotation axis which may be arranged parallel to a width direction of the polymer based film 1 to be printed. The gravure cylinder 2 may have length extension parallel to the width direction of the polymer based film 1 to be printed. In the example wherein the gravure cylinder 2 is engraved with two individual patterns, i.e., a first pattern and a second pattern, a first half of the circumference C1 is engraved with the first pattern, and a second half of the circumference C1 is engraved with the second pattern.

Each of said one or more patterns may have an equal length. Conventionally, the circumference C1 of the gravure cylinder 2 is less than the length of the polymer based film 1, such that said one or more patterns are repeated on the polymer based film 1. Said one or more patterns define a pattern repetition, having a pattern repetition length. Each pattern of the pattern repetition is unique and is not identical or equal to another pattern of the pattern repetition. The pattern repetition length substantially corresponds to the circumference C1 of the gravure cylinder 2.

When the polymer based film 1 has been printed, the polymer based film 1 is provided with a print comprising one or more patterns subsequent each other in the length direction of the polymer based film 1. In one example, the polymer based film 1 is printed with a print comprising a first pattern and a second pattern, wherein the second pattern is subsequent the first pattern as seen in the length direction of the polymer based film 1.

In the above, the rotogravure printing has been described with reference to one gravure cylinder 2, but the skilled person understands that the process is repeated for each colour forming the print. Each gravure cylinder 1 in the rotogravure printing process typically has the same circumference C1.

Figure 1B:
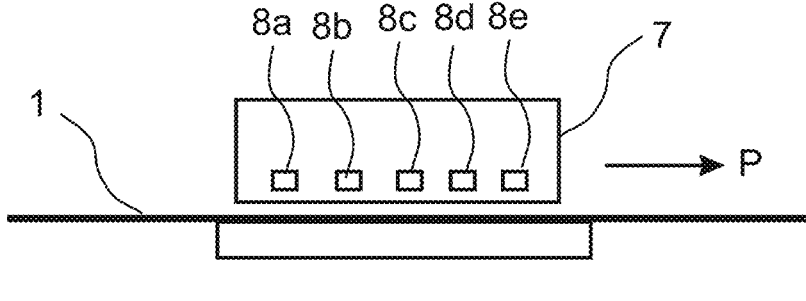
FIG. 1B shows schematically a digital printing process of a polymer based film.

Digital printing offers a more flexible printing process, compared to rotogravure printing wherein each individual design requires individual engraving of gravure cylinders 2. An example of a digital printing method is inkjet printing with an inkjet printer 7, which is shown schematically in FIG. 1B.

In an example of inkjet printing, the substrate to be printed is conveyed below a number of print bars 8a-8e. In the present disclosure, the substrate to be printed is the polymer based film 1 described above with reference to FIG. 1A. The print bars 8a-8e may extend transverse to the conveying direction, or printing direction, P. The print bars 8a-8e may each comprise a number of ink-jet print heads. The inkjet print heads eject drops of ink on the substrate. The degree of freedom of the print is unlimited with digital printing, but if an embossed structure in register with the print is desired, costs for engraving a large number of embossing rollers limit the design possibilities. Thereby, even by digital printing, the print may be repeated over a length of the substrate to printed.

In the present disclosure, the polymer based film 1 may be digitally printed with a pattern. The pattern may have a pattern repetition. The pattern repetition may comprise one or more patterns subsequent each other in the length direction of the polymer based film 1. Each pattern of the pattern repetition is unique and is not identical or equal to another pattern of the pattern repetition. The pattern repetition has a pattern repetition length. The pattern repetition length may be defined as the distance, in the length direction of the printed polymer based film 1, from the beginning of the first pattern in the pattern repetition to the end of the last pattern in the pattern repetition, in the length direction of the printed polymer based film 1. If the pattern repetition only comprises one pattern, the pattern repetition length is measured from the beginning of the pattern to the end of the pattern, in the length direction of the printed polymer based film 1.

By digital printing, unnecessary repetition of the pattern can be avoided. For example, the polymer based film 1 can be printed with a pattern having an extension in the length direction substantially corresponding to the length of the polymer based film 1. By digital printing, the pattern repetition may comprise one pattern, having a length substantially corresponding to the length of the polymer based film 1.

In the following, examples wherein the pattern is a wood grain pattern will be described. However, in other examples, the pattern may be any type of pattern such as a stone pattern, a tile pattern, a fantasy pattern, etc.

Figure 2A:
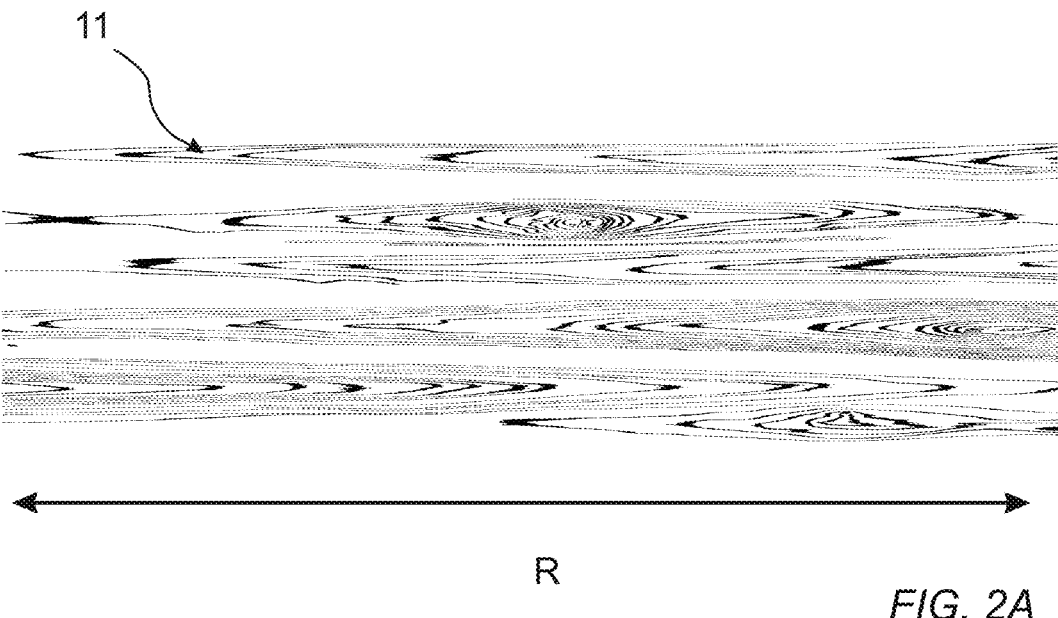
FIG. 2A shows a portion of a printed polymer based film, comprising a first pattern.
Figure 2B:
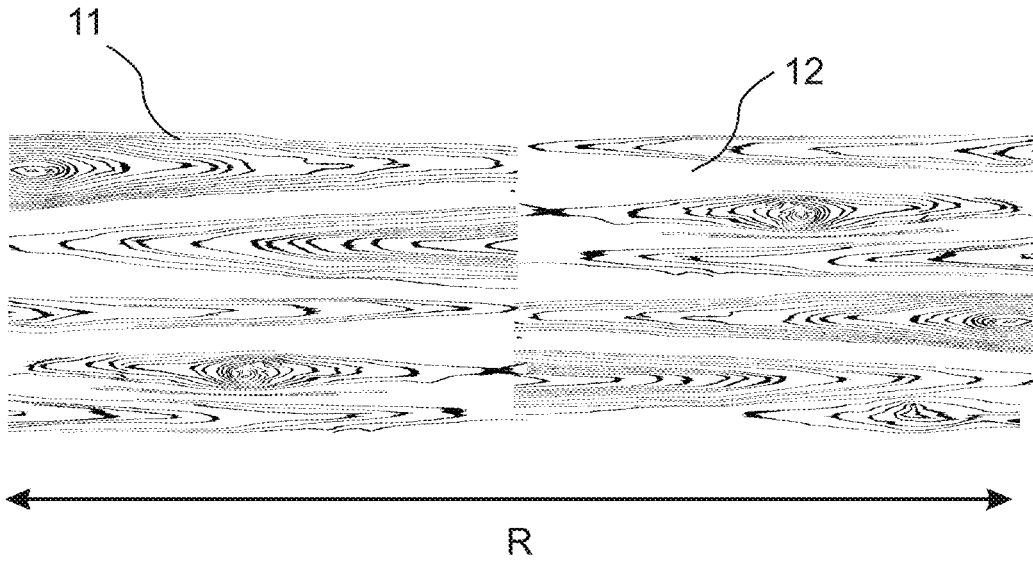
FIG. 2B shows a portion of a printed polymer based film, comprising a first pattern and a second pattern.

FIG. 2A-B show an example of a portion of the printed polymer based film 1. The printed polymer based film 1 may have been printed by a rotogravure printing process, as described above with reference to FIG. 1A, or may have been digitally printed, as described above with reference to FIG. 1B.

In the example shown in FIG. 2A, the polymer based film 1 is printed with one pattern, i.e., a first pattern 11, in the length direction of the printed polymer based film. In this example, the pattern repetition only comprises one pattern. The pattern repetition length R corresponds to the length of the pattern in the length direction of the printed polymer based film 1.

The first pattern 11 shown in FIG. 2A may comprise wood elements, such as wood grains, knots and or medullary rays. The design of the wood elements may be designed such that unique patterns are formed.

In FIG. 2A, only a portion of the print of the polymer based film 1 is shown in the width direction of the polymer based film 1. The width of the print on the polymer based film 1 may be substantially the same as the width of the polymer based film 1. Consequently, only a portion of the first pattern 11 is shown in the width direction of the printed polymer based film 1. The first pattern 11 and the second pattern 12 can be seen as representing a set of first patterns and a set of second patterns, respectively, in the width direction of the printed polymer based film 1.

The pattern 11 may be repeated in the length direction of the polymer based film 1.

If the print shown in FIG. 2A is printed by rotogravure, the pattern repetition length R may substantially correspond to the circumference C1 of the gravure cylinder 2.

If printing by digital printing, the pattern 11 may have a length substantially corresponding to the length of polymer based film 1.

FIG. 2B shows a second example of a portion of the printed polymer based film 1. The printed polymer based film 1 may have been printed by a rotogravure printing process, as described above with reference to FIG. 1A, or may have been digitally printed, as described above with reference to FIG. 1B.

In the example shown in FIG. 2B, the polymer based film 1 is printed with two patterns in the length direction, a first pattern 11 and a second pattern 12. In other examples, the polymer based film 1 may be printed with any number of individual patterns exceeding two, such as 3-5 unique patterns, i.e., not being identical and subsequent each other in the length direction. Consequently, the pattern repetition may comprise one or more patterns in the length direction of the printed polymer based film 1.

In FIG. 2B, only a portion of the print of the polymer based film 1 is shown in the width direction of the polymer based film 1. The width of the print on the polymer based film 1 may be substantially the same as the width of the polymer based film 1. Consequently, only a portion of the first pattern 11 and of the second pattern 12 is shown in the width direction of the printed polymer based film 1. The first pattern 11 and the second pattern 12 can be seen as representing a set of first patterns and a set of second patterns, respectively, in the width direction of the printed polymer based film 1.

FIG. 2B shows the first pattern 11 and the second pattern 12. The first pattern 11 is not identical to the second pattern 12. The first pattern 11 and the second pattern 12 form the pattern repetition, having the pattern repetition length R in the length direction of the printed polymer based film 1. The pattern repetition length R may be measured from the beginning of the first pattern 11 to the end of the second pattern 12. Each pattern in the pattern repetition may have an equal length in the length direction of the printed polymer based film 1.

The first pattern 11 and the second pattern 12 may be formed by rotogravure printing, as described above with reference to FIG. 1A, or by digital printing such as inkjet printing as described above with reference to FIG. 1B. Irrespectively of the method, the resulting printed pattern may be substantially the same.

If the print shown in FIG. 2B is printed by rotogravure, the pattern repetition length R may substantially correspond to the circumference C1 of the gravure cylinder 2.

The first pattern 11 and the second pattern 12 shown in FIGS. 2A and 2B may comprise wood elements, such as wood grains, knots and or medullary rays. The design of the wood elements may be designed such that unique patterns are formed.

Each pattern in the pattern repetition may be comprise a basic wood grain pattern. To the basic wood grain pattern wood elements are added, which are unique for each pattern in the pattern repetition. The wood elements being unique for each pattern may, for example, be knots and/or medullary rays.

Each pattern in the pattern repetition may comprise a first set of design elements, which are common for all patterns in the pattern repetition. Each pattern in the pattern repetition further comprises a second set of design elements, which are non-identical for the patterns in the pattern repetition. The first set of design elements may form a basic wood pattern. The second set of design elements adds certain features to the basic wood pattern, such as knots or medullary rays, such that each pattern in the pattern repetition is unique.

If the pattern repetition comprises more than one pattern, the patterns may be configured to match each other, or at least to match a beginning and an end of adjacent patterns, as seen in the length direction of the printed polymer based film 1. The end of a first pattern may be configured to match a beginning of a second pattern, subsequent the first pattern in the length direction, such that a transition between one pattern to the subsequent pattern may be obtained. Thereby, a less distinct border between adjacent pattern can be obtained.

The pattern, or patterns, of the printed polymer based film 1 may be used for forming an embossing device. The embossing device may be an embossing roller or an embossing belt, as will be described below with reference to FIGS. 3-5.

The embossing device is engraved with an embossed structure being in register with, or being at least partly in register, with the pattern, or patterns, of the printed polymer based film 1. The embossing device is engraved with an embossed structure being in register with the pattern or patterns, or a portion of the pattern or the patterns, of the printed polymer based film 1.

In one example wherein the first pattern 11 and/or the second pattern 12 comprises a common wood grain pattern, the embossed structure may correspond to the common wood grain pattern. Thereby, the embossed structure is in register with the common wood grain pattern, such that the first pattern 11 and the second pattern 12 is in register or partly in register with the embossed structure.

In one example wherein the first pattern 11 and/or the second pattern 12 comprise a first set of design elements being common for both the first pattern 11 and the second pattern 12, the embossed structure may correspond to the first set of design element. Thereby, the embossed structure is in register with first set of design elements, such that the first pattern 11 and the second pattern 12 is partly in register with the embossed structure.

In one example wherein the pattern has a pattern repetition length exceeding a perimeter of the embossing device, the pattern or patterns forming the pattern repetition may have, within the pattern repetition length, a first set of elements being common and repeated within the pattern repetition, and a second set of elements being non-identical. The second set of elements forms the unique design of the pattern, or patterns, in the pattern repetition. The embossed structure of the embossing device may correspond to the first set of elements, such as at least parts of the pattern, or patterns, is in register with the embossed structure.

One example of a pattern having a pattern repetition length exceeding the perimeter of the embossing device, is a pattern having a length substantially corresponding to the length of the polymer based film 1.

Figures 3, 4, 5:
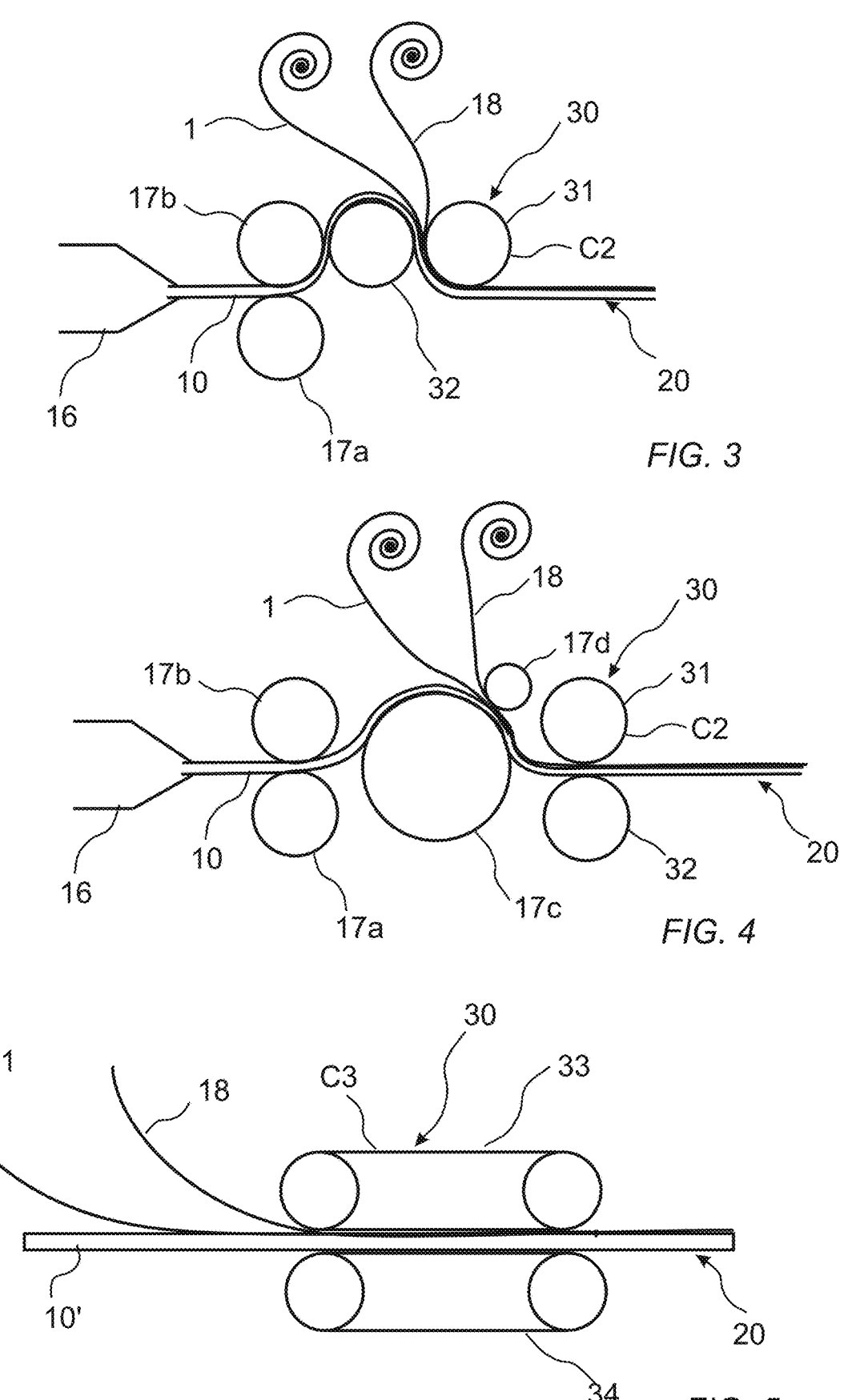
FIG. 3 shows schematically a process for forming a laminated substrate according to a first example.
FIG. 4 shows schematically a process for forming a laminated substrate according to a second example.
FIG. 5 shows schematically a process for forming a laminated substrate according to a third example.

FIG. 3 shows a continuous process for forming a laminated substrate. The layers of the laminated substrate may be applied and joined inline in the process.

In the process shown in FIG. 3, a substrate 10 is produced in an extrusion process by an extruder 16, or by a co-extruder. Thereby, the substrate 10 is an extruded substrate. The substrate 10 is formed in a continuous process.

The substrate 10 may have a rectangular shape, for example, having a length exceeding a width.

The substrate 10 may comprise a polymer based material. The polymer based material may be a thermoplastic or a thermoset. The polymer based material may be, or comprise polyvinyl chloride (PVC), polyester, polypropylene (PP), polyethylene (PE), polystyrene (PS), thermoplastic polyurethane (PU), thermosetting polyurethane (PU), polyethylene terephthalate (PET), polyacrylate, methacrylate, polycarbonate, polyvinyl butyral, polybutylene terephthalate, or a combination thereof. The substrate 10 may comprise 10-60 wt % of the polymer material.

The substrate 10 may further comprises fillers. The fillers may be organic and/or inorganic. The organic fillers may be wood dust, grounded risk husk, cork, bamboo dust. The inorganic fillers may be calcium carbonate, chalk, limestone, talc, stone dust, fly ash.

The substrate 10 may comprise 30-90 wt % of said fillers.

The substrate 10 may further comprise additives, such as impact modifier, stabilizers, lubricants, foaming agent, and/or plasticizer. The substrate may comprise 0.1-20 wt % of said additives. The substrate 10 may further comprise pigments. The substrate may comprise 0.1-20 wt % of said pigments.

In one example, the substrate 10 may comprise 10-30 wt % PVC, 50-90 wt % chalk, and 0-20 wt % additives. Such a substrate 10 may be of a type conventionally referred to as SPC.

A feeding speed of the continuous process comprising the extruder 16, or co-extruder, may be 0.5-12 m/min, such as 1-10 m/min or 1.5-9.0 m/min.

A barrel temperature of the extruder 16 may be 145-225° C. A barrel temperature of the extruder 16 may be 145-225° C. when extruding PVC. Alternatively, or additionally, an extrudate temperature directly after forming may be 90-280° C. When the substrate 10 comprising PVC, the extrudate temperature may be 90-225° C., preferably 145-220° C.

The substrate 10 may be calendered by passing one or more calender rollers 17a, 17b such that the substrate 10 obtains a desired thickness. After calendering, the substrate may have a thickness of 2-10 mm. As an alternative or complement, the substrate 10 may be pressed to the desired thickness.

A feeding speed of the continuous process comprising the extruder 16, or co-extruder, and calender roller arrangement 17a, 17b may be 0.5-12 m/min, such as 1-10 m/min or 1.5-9.0 m/min.

After calendering, the substrate 10 may be feed over a roller 32. After calendering, the printed polymer based film 1 described above with reference to FIGS. 1A, 1B, 2A and 2B is applied on a first surface of the substrate 10. The polymer based film 1 may have been printed by rotogravure printing as described above with reference to FIG. 1A, or may have been printed by digital printing as described above with reference to FIG. 1B.

The printed polymer based film 1 may be applied to the substrate 10 prior to cooling the substrate 10.

The printed polymer based film 1 may be applied on the substrate 10 such that the length direction of the printed polymer based film 1 is substantially parallel to a length direction of the substrate 10.

In FIG. 3, a protective layer 18 is applied on the printed polymer based film 1. The protective layer 18 may be a protective film, such as a polymer based film. The polymeric material of the protective film may be a thermoplastic or a thermoset. The polymer based film may be of, or comprise polyvinyl chloride (PVC), polyester, polypropylene (PP), polyethylene (PE), polystyrene (PS), thermoplastic polyurethane (PU), thermosetting polyurethane (PU), polyethylene terephthalate (PET), polyacrylate, methacrylate, polycarbonate, polyvinyl butyral, polybutylene terephthalate, or a combination thereof.

The protective layer 18 may have a thickness of 0.1-2 mm.

Optionally, a backing layer (not shown) may be applied to a second surface of the substrate 10, opposite the printed polymer based film 1.

The substrate 10, the printed polymer based film 1, and optionally the protective layer 18 and backing layer are adhered to each by applying pressure, for example in a pressing and embossing device 30. In the example shown in FIG. 3, the pressing and embossing device 30 comprises rollers 31 and 32. Heat may also be applied during pressing.

After pressure has been applied by the rollers 31 and 32, a laminated substrate 20 is obtained. The laminated substrate 20 comprises the substrate 10 and the printed polymer based film 1. The laminated substrate 20 may optionally further comprise the protective layer 18 and the backing layer.

In the pressing and embossing device 30, the laminated substrate 20 is provided with an embossed structure by the embossing roller 31. The embossing roller 31 is configured to emboss the laminated substrate 20 with an embossed structure.

The pressing roller 32 may apply counter pressure to the second surface of the substrate 10, opposite the printed polymer based film 1.

The embossing roller 31 is engraved with the embossed structure. The embossing roller 31 has a circumference C2. The circumference surface of the embossing roller 31 is engraved with the embossed structure.

The embossing roller 31 may have a rotation axis which may be arranged parallel to a width direction of the printed polymer based film 1. The embossing roller 31 may have length extension parallel to the width direction of the printed polymer based film 1. The embossing roller 31 may have a rotation axis substantially transverse to the length direction of the polymer based film 1.

In the example wherein the polymer based film 1 has been printed by rotogravure, the circumference C2 of the embossing roller 31 may substantially correspond to the circumference C1 of the gravure cylinder 2. Thereby, the embossed structure obtained by the embossing roller 31 may be in register, or at least partly in register, with the pattern, or patterns, of the printed polymer based film 1.

The embossing roller 31 may have a rotation axis substantially parallel to the rotation axis of gravure cylinder 2, if the polymer based film 1 has been printed by rotogravure.

Irrespectively of the printing method, the pattern repetition length R, in the length direction of the printed polymer based film 1, may substantially corresponds to the circumference C2 of the embossing roller 31. Thereby, the embossed structure obtained by the embossing roller 31 may be in register, or at least partly in register, with the pattern, or patterns, of the printed polymer based film 1.

After embossing, an embossed laminated substrate 20 is obtained. The laminated substrate 20 can be further divided into panels, which will be described with reference to FIGS. 6-8.

FIG. 4 shows an example of a continuous process similar to the process in FIG. 3. In FIG. 4, the arrangement of rollers is different from the arrangement of rollers in FIG. 3. In all other aspects, the disclosure above for FIG. 3 is applicable also for the example in FIG. 4. In FIG. 4, after extrusion, the substrate 10 of the above the described type is calendered by passing one or more calender rollers 17a, 17b such that the substrate 10 obtains a desired thickness. The substrate 10 is thereafter feed over roller 17c. The printed polymer based film 1 of the above described type and the optional protective layer 18 is applied to the substrate 10 and fed between the rollers 17c and 17d.

As described above , the substrate 10, the printed polymer based film 1, and optionally the protective layer 18 and backing layer are adhered to each by applying pressure, for example in a pressing and embossing device 30. In the example shown in FIG. 4, the pressing and embossing device 30 comprises rollers 31 and 32. Heat may also be applied during pressing.

After pressure has been applied by the rollers 31 and 32, a laminated substrate 20 is obtained. The laminated substrate 20 comprises the substrate 10 and the printed polymer based film 1. The laminated substrate 20 may optionally further comprise the protective layer 18 and the backing layer.

In the pressing and embossing device 30, the laminated substrate 20 is provided with an embossed structure by the embossing roller 31. The embossing roller 31 is configured to emboss the laminated substrate 20 with an embossed structure.

The pressing roller 32 may apply counter pressure on the second surface of the substrate 10, opposite the printed polymer based film 1.

The embossing roller 31 is engraved with the embossed structure. The embossing roller 31 has a circumference C2. The circumference surface of the embossing roller 31 is engraved with the embossed structure. The embossing roller 31 may correspond to the embossing roller in FIG. 3, and the disclosure with reference to FIG. 3 is applicable also for the embossing roller in FIG. 4.

FIG. 5 shows another example of a process for forming a laminated substrate. In the process shown in FIG. 5, a substrate 10' is provided. The substrate 10' may be formed in a prior process. The substrate 10' may be pressed, for example by calendering a number of layers, which together form the substrate 10'.

The substrate 10' may comprise a polymer based material. The polymer based material may be a thermoplastic or a thermoset. The polymer based material may be, or comprise polyvinyl chloride (PVC), polyester, polypropylene (PP), polyethylene (PE), polystyrene (PS), thermoplastic polyurethane (PU), thermosetting polyurethane (PU), polyethylene terephthalate (PET), polyacrylate, methacrylate, polycarbonate, polyvinyl butyral, polybutylene terephthalate, or a combination thereof. The substrate 10' may comprise 10-60 wt % of the polymer material.

The substrate 10' may further comprises fillers. The fillers may be organic and/or inorganic. The organic fillers may be wood dust, grounded risk husk, cork, bamboo dust. The inorganic fillers may be calcium carbonate, chalk, limestone, talc, stone dust, fly ash. The substrate 10 may comprise 30-90 wt % of said fillers. The substrate 10' may comprise 30-90 wt % of said fillers.

The substrate 10' may further comprise additives, such as impact modifier, stabilizers, lubricants, foaming agent, and/or plasticizer. The substrate may comprise 0.1-20 wt % of said additives. The substrate 10 may further comprise pigments. The substrate may comprise 0.1-20 wt % of said pigments.

The substrate 10' may have a thickness of 2-10 mm.

In one example, the substrate 10 may comprise 10-30 wt % PVC, 50-90 wt % chalk, and 0-20 wt % additives. Such a substrate 10 may be of a type conventionally referred to as SPC.

The printed polymer based film 1 described above is applied on a first surface of the substrate 10. The polymer based film 1 may have been printed by rotogravure printing as described above with reference to FIG. 1A, or may have been printed by digital printing as described above with reference to FIG. 1B.

The printed polymer based film 1 may be applied on the substrate 10' such as that the length direction of the printed polymer based film 1 is substantially parallel to a length direction of the substrate 10'.

In FIG. 5, a protective layer 18 is applied on the printed polymer based film 1. The protective layer 18 may be a protective film, such as a polymer based film. The polymer material of the protective film may be a thermoplastic or a thermoset. The polymer based film may be of, or comprise polyvinyl chloride (PVC), polyester, polypropylene (PP), polyethylene (PE), polystyrene (PS), thermoplastic polyurethane (PU), thermosetting polyurethane (PU), polyethylene terephthalate (PET), polyacrylate, methacrylate, polycarbonate, polyvinyl butyral, polybutylene terephthalate, or a combination thereof.

The protective layer 18 may have a thickness of 0.1-2 mm. Optionally, a backing layer (not shown) may be applied to a second surface of the substrate 10', opposite the printed polymer based film 1.

The substrate 10', the printed polymer based film 1, and optionally the protective layer 18 and backing layer are adhered to each by applying pressure, for example in an embossing and pressing device 30. In the example shown in FIG. 5, the pressing device 30 comprises a double belt press 33, 34. Heat may also be applied during pressing.

The upper belt 33 of the double belt press is provided with an embossed structure, forming an embossing belt, such that pressing and embossing takes place in one process step.

After passing the pressing device 30, a laminated substrate 20 has been obtained. The laminated substrate 20 comprises the substrate 10' and the printed polymer based film 1. The laminated substrate 20 may optionally further comprise the protective layer 18 and the backing layer. The laminated substrate 20 is provided with an embossed structure.

In the example shown in FIG. 5, embossing takes place simultaneously as pressing, and thereby, forming the laminated substrate 20.

The embossed structure of the upper press belt 33 is configured to emboss the laminated substrate 20 with an embossed structure. The uppermost layer may be the printed polymer based film 1.

The embossed press belt 33, forming the embossing belt, has a perimeter C3. The embossed press belt 33 is engraved with the embossed structure. The perimeter C3 of the embossed press belt 33, forming the embossing belt, is engraved with the embossed structure. The perimeter surface of the embossed press belt 33 may be defined as the length of the surface intended to contact the uppermost layer of the laminated substrate The embossed press belt 33 has a length extension parallel to the length direction of the printed polymer based film 1.

In the example wherein the polymer based film 1 has been printed by rotogravure, the perimeter C3 of the embossed press belt 33 substantially corresponds to the circumference C1 of the gravure cylinder 2. Thereby, the embossed structure obtained by the embossed press belt 33 may be in register, or at least partly in register, with the pattern, or patterns, of the printed polymer based film 1.

Irrespective of the printing method, the pattern repetition length R, in the length direction of the printed polymer based film 1, substantially corresponds to the perimeter C3 of the embossed press belt 33. Thereby, the embossed structure obtained by the embossing roller 31 may be in register, or at least partly in register, with the pattern, or patterns, of the printed polymer based film 1.

After embossing, an embossed laminated substrate 20 is obtained. The laminated substrate 20 can be further divided into panels, which will be described with reference to FIGS. 6-8.

After embossing, a coating (not shown) may be applied to the printed polymer film 1, or to the protective layer 18 if such a layer has been applied.

Figure 6:
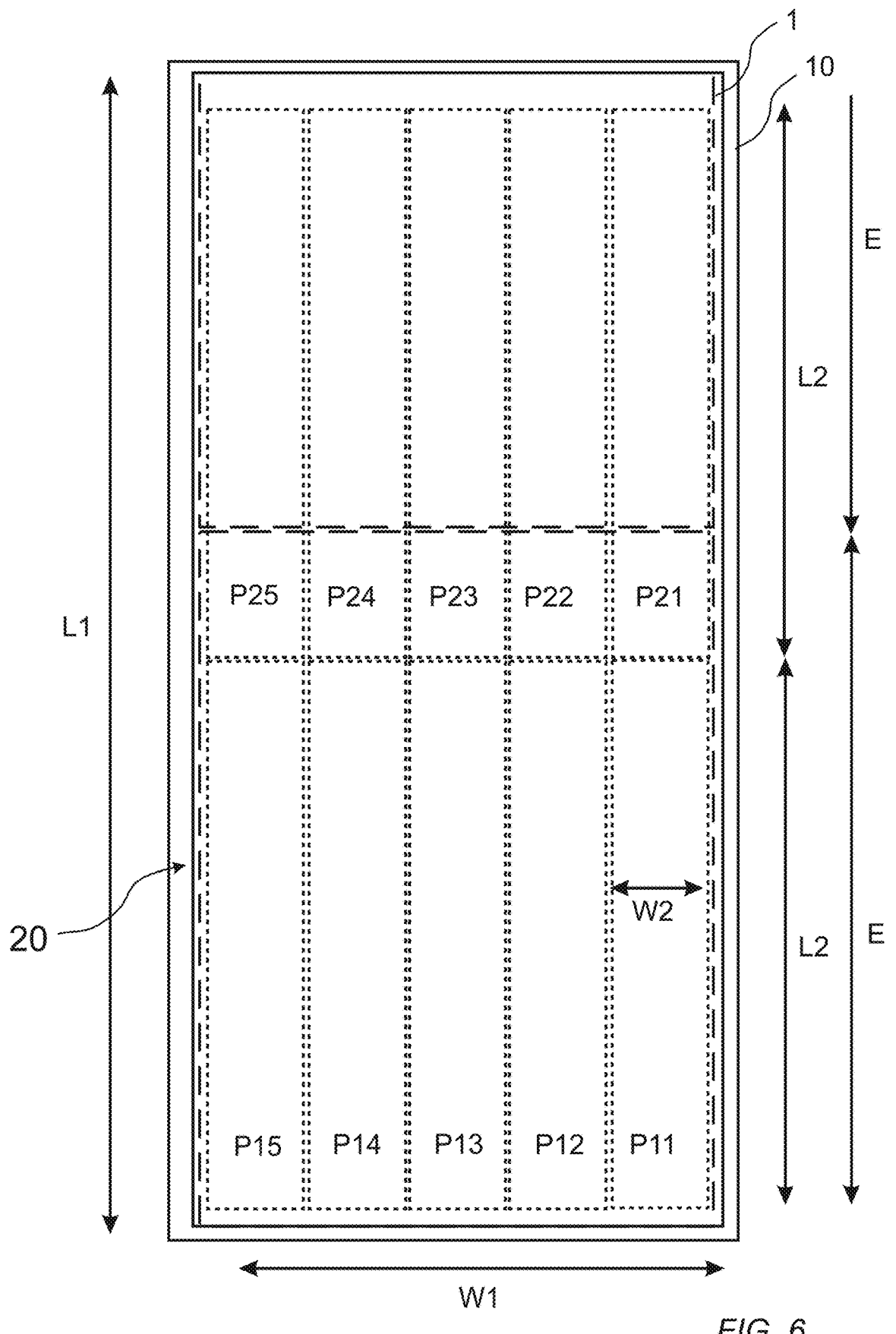
FIG. 6 shows a top view of the laminated substrate according to a first example.

FIG. 6 shows an example of the laminated substrate 20 after pressing and embossing as seen from above. The laminated substrate 20 comprises the substrate 10 or substrate 10' and the printed polymer based film 1. The laminated substrate 20 may be formed by any of the methods described above with reference to FIGS. 3-5. A planar extension of the polymer based film 1 substantially corresponds to a planar extension of the substrate 10. In the example shown in FIG. 6, the laminated substrate 20 has rectangular shape, having a length L1 and a width W1. In the example shown in FIG. 6, the length L1 is exceeding the width W1 of the laminated substrate 20. The length direction of the polymer based film 1 is substantially parallel with the length direction of the substrate 10.

The laminated substrate 20 is intended to be divided into panels, which are shown with dotted lines in FIG. 6. The laminated substrate 20 may be divided into panels, for example, by sawing. The panels may further be provided with a mechanical locking system. When dividing the laminated substrates into panels, a distance required for dividing the laminated substrate 20 into individual panels, and/or a distance required for machining a mechanical locking system along edges of the panels, may be taken into consideration.

The panels may be tiles or planks. In the example shown in FIG. 6, the panels are plank-shaped, i.e., having a length L2 exceeding a width W2. In the example shown in FIG. 6, the length direction of the planks is substantially parallel to the length direction of the laminated substrate 20. Each panel may have an equal length L2 and width W2.

In the example shown in FIG. 6, the laminated substrate 20 is intended to be divided into 10 panels P11, P12, P13, P14, P15, P21, P22, P23, P24, P25. In FIG. 6, the laminated substrate 20 is intended to be divided into panels arranged in a first row of the panels P11, P12, P13, P14, P15 and in a second row of panels P21, P22, P23, P24, P25 arranged subsequent the first row of the panels in the length direction of the laminated substrate In one example, the panels may have a width of 178 mm and a length of 1219 mm (7×48"). If extruding the substrate 10 in an extruder having a width of approximately 1 m, 5 panels having a width of 178 mm may be provided side by side in the width direction of the substrate 10, as shown in FIG. 6. The panels shown in FIG. 6 may have a length of 1219 mm.

If an extruder having a width of approximately 1.3 m is used for extruding the substrate 10, 7 panels having a width of 178 mm may be provided side by side in the width direction of the substrate 10. Correspondingly, such a laminated substrate may be intended to be divided into 14 panels.

In another example, the panels may have a width of 305 mm and a length of 610 mm (12×24").

In further examples, the panels may have a width of 229 mm and a length of 1524 mm (9×60"). In other examples, the panels may be tiles having a width and length of 457 mm (18×18").

The laminated substrate 20 shown in FIG. 6 has been embossed with the embossing device having the perimeter C2 exceeding the length of L2 of the panels into which the laminated substrate 20 is to be divided. Consequently, a length E of the embossed structure, as measured in the length direction of the laminated substrate 20, exceeds the length of the panels L2. The embossed structure is shown with dashed lines in FIG. 6.

The length L2 of the panels (shown with dotted lines) does not coincide with the length E of the embossed structure (shown in dashed lines), as seen in FIG. 6.

As can be seen in FIG. 6, the perimeter of C2 of the embossing device divided by the length L2 of the panel is a non-integer n. The non-integer n may be exceeding 1, such as 1.1-1.9. In other examples, the non-integer may be in the range of 2.1-2.9. More generally, the non-integer may be in the range of an integer n+0.1 to the integer n+0.9, such as in the range of 1.1-1.9 or 2.1-2.9 or 3.1-3.9. The integer may be chosen such as unnecessary repetition may be avoided, such as avoiding the integer being equal to n+0.5, such as 1.5, 2.5 etc. As such, the non-integer may be in the range of an integer n+0.1 to n+0.4 and n+0.6 to n+0.9; such as 1.1-1.4, 1.6-1.9, 2.1-2.4, 2.6-2.9, 3.1-3.4, 3.6-3.9, etc.

The perimeter C2 of the embossing device may be at least 110% of the length L2 of the panel. The perimeter C2 of the embossing device may be 110-190% of the length L2 of the panel.

Thereby, the number of non-identical panels obtained from each laminated substrate 20 can be increased. Since the embossed structure is displaced between the panels, the panels will not be perceived as identical. The embossed structure is displaced from one panel to another, as seen in the length direction of the panel. The embossed structure of the panels obtained each laminated substrate can be varied, such that an increased number of non-identical panels is obtained.

In the example shown in FIG. 6, 10 panels with non-identical embossed structure are obtained. In known solutions, only 5 panels with non-identical embossed structure would be obtained.

Further, the number of non-identical panels obtained from each laminated substrate 20 can also be increased in respect of the pattern of the panels. The length L2 of the panels (shown with dotted lines) may not coincide with the length of the pattern. The length of the pattern may coincide with the length E of the embossed structure. Since the pattern may be displaced between the panels, the panels will not be perceived as identical. The pattern may be displaced from one panel to another, as seen in the length direction of the panel.

The embossed structure may be in register, or at least partly in register, with the print. If the printed polymer based film 1 has been printed by rotogravure, the circumference C1 of the gravure cylinder 2 may substantially correspond to the perimeter C2 of the embossing device 30. The perimeter C2 of the embossing device 30 may correspond to the length E of the embossed structure of the panel. Thereby, the embossed structure may be in register with the print, or at least in register with a part of the print.

Irrespectively of printing method, a pattern repetition length L may substantially correspond to the perimeter C2 of the embossing device 30, such that the embossed structure may be in register, or at least partly in register with the print.

Figure 7:
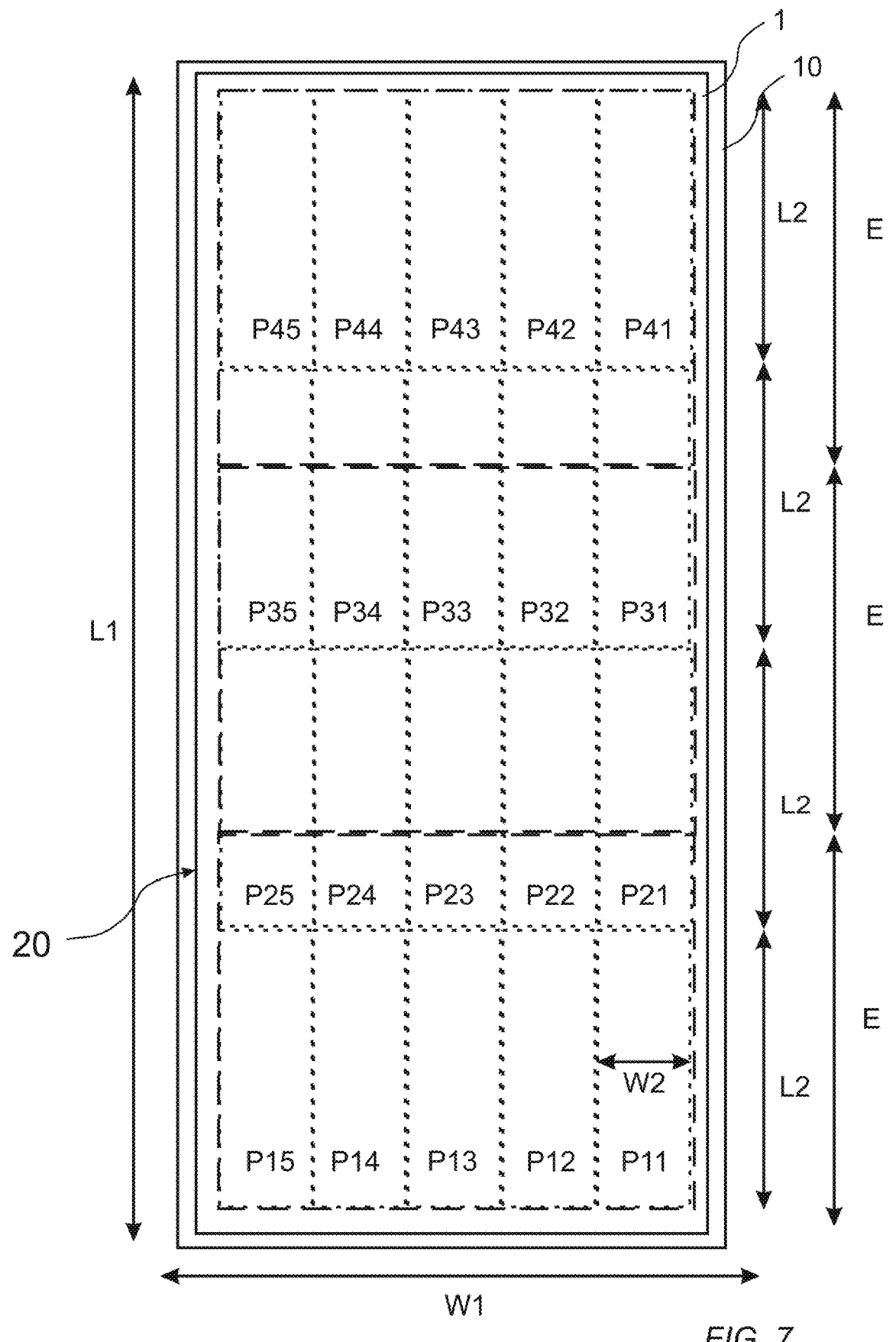
FIG. 7 shows a top view of the laminated substrate according to a second example.

In one example, the pattern repetition length does not correspond to the length E of the embossed structure. The polymer based film 1 may be printed with a pattern having a length substantially corresponding to the length of the polymer based film 1. The pattern, or patterns, may comprise elements being in register with the embossed structure of the embossing device, such that the embossed structure is partly in register with the pattern, or patterns. FIG. 7 shows a second example of the laminated substrate 20 after pressing and embossing as seen from above. The laminated substrate 20 comprises the substrate 10 or substrate 10' and the printed polymer based film 1. The laminated substrate 20 may be formed by any of the methods described above with reference to FIGS. 3-5. A planar extension of the polymer based film 1 substantially corresponds to a planar extension of the substrate 10. In the example shown in FIG. 6, the laminated substrate 20 has rectangular shape, having a length L1 and a width W1. In the example shown in FIG. 6, the length L1 is exceeding the width W1 of the laminated substrate 20. The length direction of the polymer based film 1 is substantially parallel with the length direction of the substrate The laminated substrate 20 is intended to be divided into panels, which are shown with dotted lines in FIG. 7. The laminated substrate 20 is divided into panels, for example, by sawing. The panels may further be provided with a mechanical locking system. When dividing the laminated substrates into panels, a distance required for dividing the laminated substrate 20 into individual panels, and/or a distance required for machining a mechanical locking system along edges of the panels, may be taken into consideration.

The panels may be tiles or planks. In the example shown in FIG. 7, the panels are plank-shaped, i.e., having a length L2 exceeding a width W2. In the example shown in FIG. 7, the length direction of the planks is substantially parallel to the length direction of the laminated substrate 20. Each panel may have an equal length L2 and width W2.

In the example shown in FIG. 7, the laminated substrate 20 is intended to be divided into 20 panels P11, P12, P13, P14, P15, P21, P22, P23, P24, P25, P31, P32, P33, P34, P35, P41, P42, P43, P44, P45. In FIG. 7, the laminated substrate 20 is intended to be divided into panels arranged in a first row of panels, including panels P11, P12, P13, P14, P15, in a second row of panels, including panels P21, P22, P23, P24, P25, in a third row panels, including panels P31, P32, P33, P34, P35, and in a fourth row of panels, including panels P41, P42, P43, P44, P45. The rows of panels are arranged subsequent each other in the length direction of the laminated substrate 20.

In one example, the panels may have a width of 178 mm and a length of 1219 mm (7p33 48"). If extruding the substrate 10 in an extruder having a width of approximately 1 m, 5 panels having a width of 178 mm may be provided side by side in the width direction of the substrate 10, as shown in FIG. 7.

If an extruder having a width of approximately 1.3 m is used for extruding the substrate 10, 7 panels having a width of 178 mm may be provided side by side in the width direction of the substrate 10. Correspondingly, such a laminated substrate may be intended to be divided into 28 panels.

In another example, the panels may have a width of 305 mm and a length of 610 mm (12×24").

In further examples, the panels may have a width of 229 mm and a length of 1524 mm (9×60"). In other examples, the panels may be tiles having a width and length of 457 mm (18×18").

The laminated substrate 20 shown in FIG. 7 has been embossed with the embossing device having the perimeter C2 exceeding the length of L2 of the panels into which the laminated substrate 20 is to be divided. Consequently, a length E of the embossed structure, as measured in the length direction of the laminated substrate 20, exceeds the length of the panels L2. The embossed structure is shown with dashed lines in FIG. 6.

The length L2 of the panels (shown with dotted lines) does not coincide with the length E of the embossed structure (shown in dashed lines), as seen in FIG. 7.

As can be seen in FIG. 7, the perimeter of C2 of the embossing device divided by the length L2 of the panel is a non-integer n. The non-integer n may be exceeding 1, such as 1.1-1.9. In other examples, the non-integer may be in the range of 2.1-2.9. More generally, the non-integer may be in the range of an integer n+0.1 to the integer n+0.9, such as in the range of 1.1-1.9 or 2.1-2.9 or 3.1-3.9. The integer may be chosen such as unnecessary repetition may be avoided, such as avoiding the integer being equal to n+0.5, such as 1.5, 2.5 etc. As such, the non-integer may be in the range of an integer n+0.1 to n+0.4 and n+0.6 to n+0.9; such as 1.1-1.4, 1.6-1.9, 2.1-2.4, 2.6-2.9, 3.1-3.4, 3.6-3.9, etc.

The perimeter C2 of the embossing device may be at least 110% of the length L2 of the panel. The perimeter C2 of the embossing device may be 110-190% of the length L2 of the panel.

Thereby, the number of non-identical panels obtained from each laminated substrate 20 can be increased. Since the embossed structure is displaced between the panels, the panels will not be perceived as identical. The embossed structure is displaced from one panel to another, as seen in the length direction of the panel. The embossed structure of the panels obtained each laminated substrate can be varied, such that an increased number of non-identical panels is obtained.

In the example shown in FIG. 7, 20 panels with non-identical embossed structure are obtained. In known solutions, only 5 panels with non-identical embossed structure would be obtained.

Further, the number of non-identical panels obtained from each laminated substrate 20 can also be increased in respect of the pattern of the panels. The length L2 of the panels (shown with dotted lines) may not coincide with the length of the pattern. The length of the pattern may coincide with the length E of the embossed structure. Since the pattern may be displaced between the panels, the panels will not be perceived as identical. The pattern may be displaced from one panel to another, as seen in the length direction of the panel.

The embossed structure may be in register, or at least partly in register, with the print. If the printed polymer based film 1 has been printed by rotogravure, the circumference C1 of the gravure cylinder 2 may substantially correspond to the perimeter C2 of the embossing device 30. The perimeter C2 of the embossing device 30 may correspond to the length E of the embossed structure of the panel. Thereby, the embossed structure may be in register, or at least partly in register with the print. Irrespectively of printing method, a pattern repetition length L may substantially correspond to the perimeter C2 of the embossing device 30, such that the embossed structure may be in register, or at least partly in register with the print.

In one example, the pattern repetition length does not correspond to the length E of the embossed structure. The polymer based film 1 may be printed with a pattern having a length substantially corresponding to the length of the polymer based film 1. The pattern, or patterns, may comprise elements being in register with the embossed structure of the embossing device, such that the embossed structure is partly in register with the pattern, or patterns.

Figure 8:
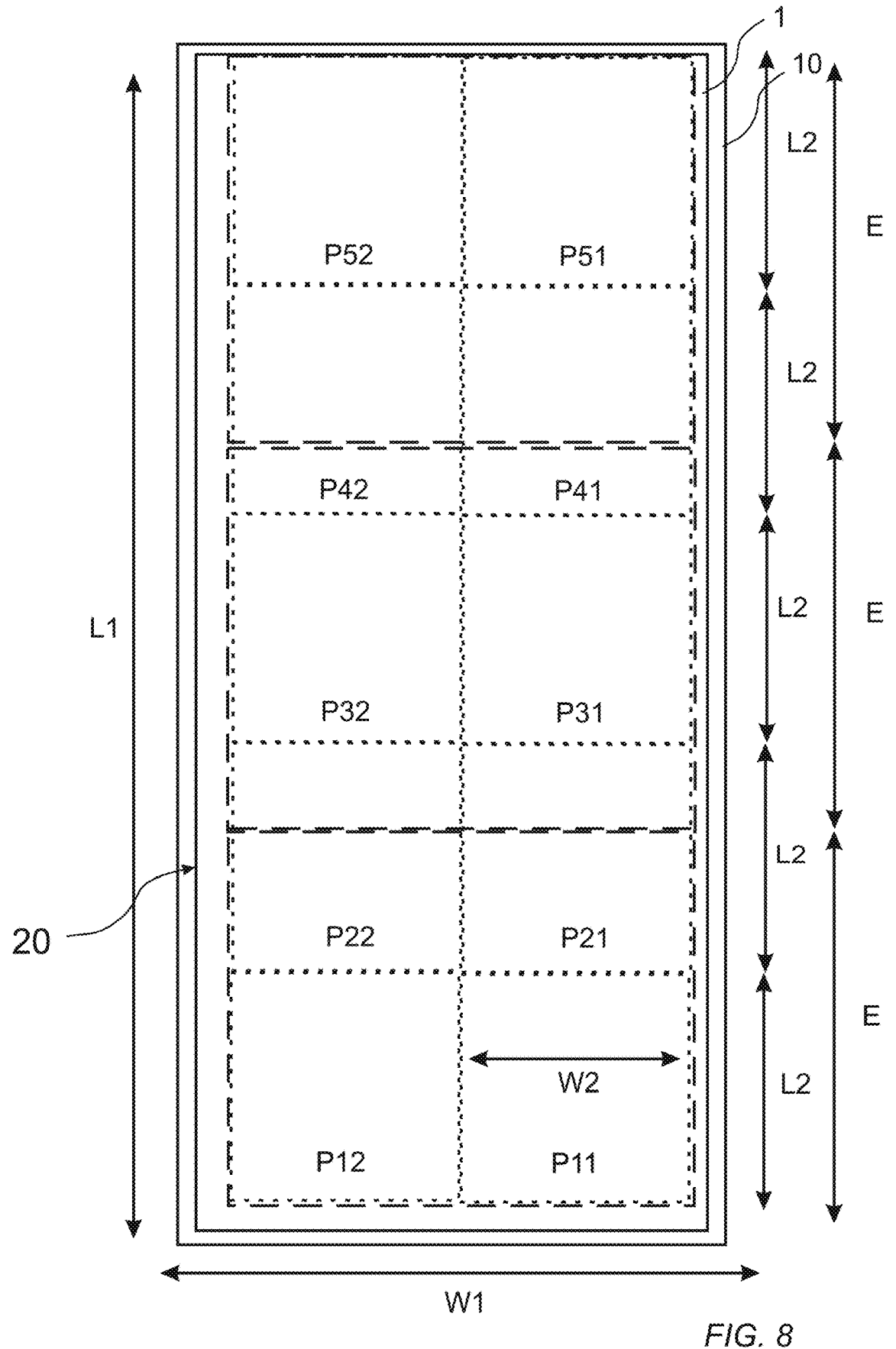
FIG. 8 shows a top view of the laminated substrate according to a third example.

FIG. 8 shows a second example of the laminated substrate 20 after pressing and embossing as seen from above. The laminated substrate 20 comprises the substrate 10 or substrate 10' and the printed polymer based film 1. The laminated substrate 20 may be formed by any of the methods described above with reference to FIGS. 3-5. A planar extension of the polymer based film 1 substantially corresponds to a planar extension of the substrate 10. In the example shown in FIG. 6, the laminated substrate 20 has rectangular shape, having a length L1 and a width W1. In the example shown in FIG. 6, the length L1 is exceeding the width W1 of the laminated substrate 20. The length direction of the polymer based film 1 is substantially parallel with the length direction of the substrate The laminated substrate 20 is intended to be divided into panels, which are shown with dotted lines in FIG. 8. The laminated substrate 20 is divided into panels, for example, by sawing. The panels may further be provided with a mechanical locking system. When dividing the laminated substrates into panels, a distance required for dividing the laminated substrate 20 into individual panels, and/or a distance required for machining a mechanical locking system along edges of the panels, may be taken into consideration.

The panels may be tiles or planks. In the example shown in FIG. 8, the panels are tile-shaped, i.e., having a length L2 being substantially similar to its width W2. Each panel may have an equal length L2 and width W2.

In the example shown in FIG. 8, the laminated substrate 20 is intended to be divided into 10 panels P11, P12, P21, P22, P31, P32, P41, P42, P51, P52. In FIG. 8, the laminated substrate 20 is intended to be divided into panels arranged in a first row of panels, including panels P11, P12, in a second row of panels, including panels P21, P22, P23, in a third row panels, including panels P31, P32, in a fourth row of panels, including panels P41, P42, and in a fifth row of panels, including panels P51, P52. The rows of panels are arranged subsequent each other in the length direction of the laminated substrate 20.

In one example, the panels may be tiles having a width and length of 457 mm (18×18").

The laminated substrate 20 shown in FIG. 8 has been embossed with the embossing device having the perimeter C2 exceeding the length of L2 of the panels into which the laminated substrate 20 is to be divided. Consequently, a length E of the embossed structure, as measured in the length direction of the laminated substrate 20, exceeds the length of the panels L2. The embossed structure is shown with dashed lines in FIG. 6.

The length L2 of the panels (shown with dotted lines) does not coincide with the length E of the embossed structure (shown in dashed lines), as seen in FIG. 8. As can be seen in FIG. 8, the perimeter of C2 of the embossing device divided by the length L2 of the panel is a non-integer n. The non-integer n may be exceeding 1, such as 1.1-1.9. In other examples, the non-integer may be in the range of 2.1-2.9. More generally, the non-integer may be in the range of an integer n+0.1 to the integer n+0.9, such as in the range of 1.1-1.9 or 2.1-2.9 or 3.1-3.9. The integer may be chosen such as unnecessary repetition may be avoided, such as avoiding the integer being equal to n+0.5, such as 1.5, 2.5 etc. As such, the non-integer may be in the range of an integer n+0.1 to n+0.4 and n+0.6 to n+0.9; such as 1.1-1.4, 1.6-1.9, 2.1-2.4, 2.6-2.9, 3.1-3.4, 3.6-3.9, etc.

The perimeter C2 of the embossing device may be at least 110% of the length L2 of the panel. The perimeter C2 of the embossing device may be 110-190% of the length L2 of the panel.

Thereby, the number of non-identical panels obtained from each laminated substrate 20 can be increased. Since the embossed structure is displaced between the panels, the panels will not be perceived as identical. The embossed structure is displaced from one panel to another, as seen in the length direction of the panel. The embossed structure of the panels obtained each laminated substrate can be varied, such that an increased number of non-identical panels is obtained.

In the example shown in FIG. 8, 10 panels with non-identical embossed structure are obtained. In known solutions, only 2 panels with non-identical embossed structure would be obtained.

Further, the number of non-identical panels obtained from each laminated substrate 20 can also be increased in respect of the pattern of the panels. The length L2 of the panels (shown with dotted lines) may not coincide with the length of the pattern. The length of the pattern may coincide with the length E of the embossed structure. Since the pattern may be displaced between the panels, the panels will not be perceived as identical. The pattern may be displaced from one panel to another, as seen in the length direction of the panel.

The embossed structure may be in register, or at least partly in register, with the print. If the printed polymer based film 1 has been printed by rotogravure, the circumference C1 of the gravure cylinder 2 may substantially correspond to the perimeter C2 of the embossing device 30. The perimeter C2 of the embossing device 30 may correspond to the length E of the embossed structure of the panel. Thereby, the embossed structure may be in register, or at least partly in register with the print.

Irrespectively of printing method, a pattern repetition length L may substantially correspond to the perimeter C2 of the embossing device 30, such that the embossed structure may be in register, or at least partly in register with the print.

In one example is the pattern repetition length not corresponding to the length E of the embossed structure. The polymer based film 1 may be printed with a pattern having a length substantially corresponding to the length of the polymer based film 1. The pattern, or patterns, may comprise elements being in register with the embossed structure of the embossing device, such that the embossed structure is partly in register with the pattern, or patterns.

In the disclosure above, the panel may be intended to be a building panel, such as a floor panel, a furniture component, a worktop, a wall panel, a ceiling panel.

Item List:

Item 1. A method to produce a panel with an embossed structure, comprising:

forming a substrate (10; 10') by a continuous process, wherein the substrate (10; 10') comprises a polymer based material, providing a polymer based film (1) printed a print having a pattern repetition comprising one or more patterns (11, 12), and wherein the pattern repetition has a pattern repetition length (R) measured in a length direction of the polymer based film (1), applying the polymer based film (1) on the substrate (10; 10'), the printed polymer based film (1) being continuously applied on the substrate (10; 10'), pressing said polymer based film (1) to the substrate (10; 10'), thereby forming a laminated substrate (20), and embossing the laminated substrate (20) by an embossing device (31; 33) such that the laminated substrate (20) obtains an embossed structure, dividing the laminated substrate (20) into panels, each panel having a length (L2) and a width (W2), and wherein the pattern repetition length (R) divided by the length (L2) of said panel is a non-integer.

Item 2. The method according to item 1, wherein a perimeter (C2) of the embossing device (31; 33) corresponds to the pattern repetition length (R).

Item 3. The method according to item 1 or 2, wherein the pattern repetition length (R) exceeds the length (L2) of the panel.

Item 4. The method according to any one of the preceding items, wherein the pattern repetition length (R) is at least 110% of the length (L2) of the panel, such as in the range of 110-190%.

Item 5. The method according to any one of the preceding items, wherein the embossed structure is at least partly in register with said one or more patterns (11, 12).

Item 6. The method according to any one of the preceding items, wherein the polymer based film (1) is printed by a rotogravure cylinder (2), wherein a circumference (C1) of the rotogravure cylinder (2) corresponds to the perimeter (C2) of the embossing device (31; 33).

Item 7. The method according to any one of items 1-5, wherein the polymer based film (1) is printed by digital printing, such as inkjet printing.

Item 8. The method according to any one of the preceding items, wherein the panel is plank or a tile.

Item 9. The method according to any one of the preceding items, wherein the substrate (10; 10') is formed by extruding.

Item 10. The method according to any one of the preceding items, wherein the polymer based film (1) is applied to the substrate (10; 10') prior to cooling the substrate (10; 10').

Item 11. The method according to any one of the preceding items, further comprising applying a protective layer to said polymer based film prior to embossing.

Item 12. The method according to any one of the preceding items, wherein pressing comprises applying heat and pressure.

Item 13. The method according to any one of the preceding items, wherein the substrate (10; 10') further comprises fillers, the fillers being one or more of: calcium carbonate, chalk, limestone, talc, stone dust, fly ash, wood dust, grounded risk husk, cork, bamboo dust.

Item 14. The method according to any one of the preceding items, wherein the printed polymer based film (1) is a PVC film.

The invention claimed is:

1. A method to produce a panel with an embossed structure, comprising:
   forming a substrate by a continuous process, wherein the substrate comprises a polymer based material,
   providing a printed polymer based film, wherein the printed polymer based film comprises a pattern, wherein the pattern has a length,
   applying the printed polymer based film on the substrate, the printed polymer based film being continuously applied on the substrate,
   pressing the printed polymer based film to the substrate, thereby forming a laminated substrate, and
   embossing the laminated substrate by an embossing device having a perimeter, such that the laminated substrate obtains an embossed structure, dividing the laminated substrate into panels, each panel having a length and a width, and
   wherein the perimeter of the embossing device divided by the length of said panel is a non-integer,
   wherein the length of the pattern is different than the length of said panel.

2. The method according to claim 1, wherein the perimeter of the embossing device exceeds the length of the panel.

3. The method according to claim 2, wherein the perimeter of the embossing device is at least 110% of the length of the panel.

4. The method according to claim 1, wherein the embossed structure is in register with at least a part of the pattern of the printed polymer based film.

5. The method according to claim 1, wherein the pattern has a pattern repetition having a pattern repetition length, wherein the pattern repetition comprises at least two patterns, wherein the perimeter of the embossing device substantially corresponds to the pattern repetition length.

6. The method according to claim 1, wherein the printed polymer based film is printed by a rotogravure cylinder, wherein a circumference of the rotogravure cylinder substantially corresponds to the perimeter of the embossing device.

7. The method according to claim 1, wherein the polymer based film is printed by digital printing.

8. The method according to claim 1, wherein the panel is a plank or a tile.

9. The method according to claim 1, wherein the substrate is formed by extruding.

10. The method according to claim 1, wherein the printed polymer based film is applied to the substrate prior to cooling the substrate.

11. The method according to claim 1, further comprising applying a protective layer to the printed polymer based film prior to embossing.

12. The method according to claim 1, wherein pressing comprises applying heat and pressure.

13. The method according to claim 1, wherein the substrate further comprises fillers, the fillers being one or more of: calcium carbonate, chalk, limestone, talc, stone dust, fly ash, wood dust, grounded rice husk, cork, bamboo dust.

14. The method according to claim 1, wherein the printed polymer based film is a PVC film.

15. The method according to claim 1, wherein the method comprises producing multiple panels.

16. The method according to claim 15, wherein the method comprises producing at least 10 panels, wherein the pattern repeats on half the panels, while an embossing pattern is different for the panels with a pattern repeat, such that none of the panels are identical.

* * * * *